United States Patent Office 3,057,137
Patented Oct. 9, 1962

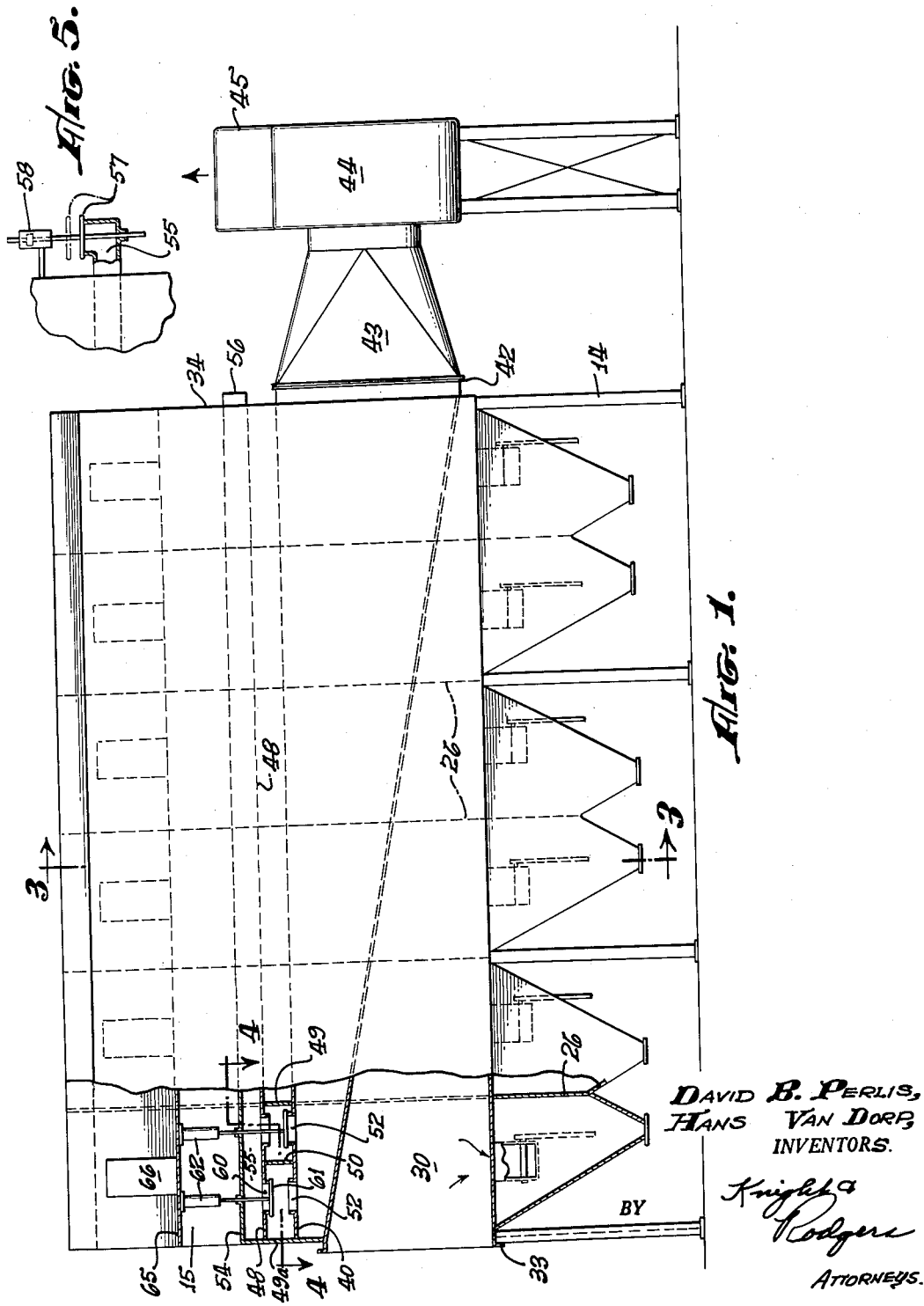

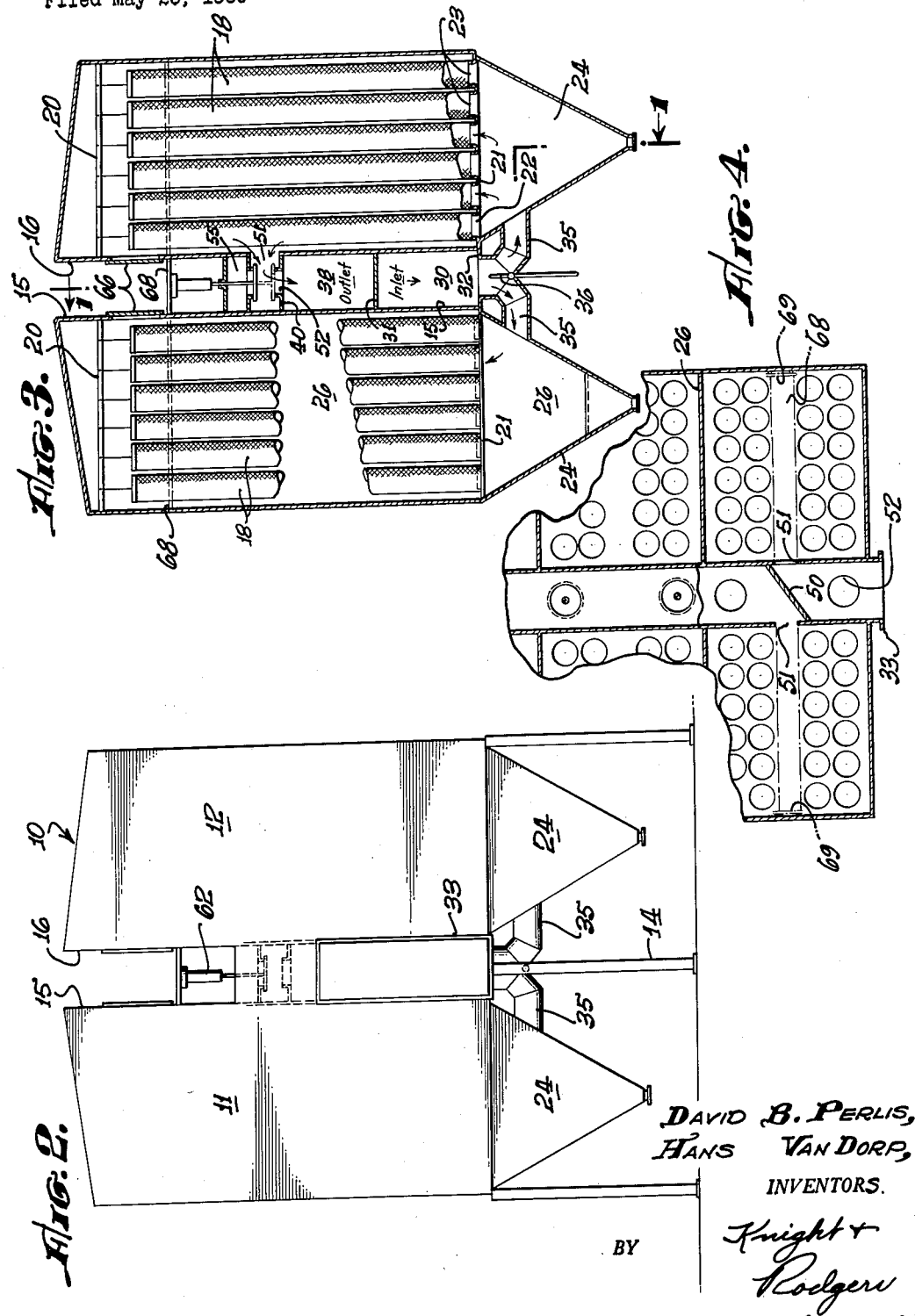

3,057,137
GAS FILTER CONSTRUCTION
David B. Perlis, Sun Valley, and Hans Van Dorp, Pasadena, Calif., assignors to Joy Manufacturing Company, Pittsburgh, Pa., a corporation of Pennsylvania
Filed May 23, 1960, Ser. No. 30,869
5 Claims. (Cl. 55—303)

The present invention relates generally to gas cleaning equipment; and more especially to the construction of the housing and duct work for a filter for cleaning gases.

Gas cleaning equipment for the general type with which the present invention is concerned comprises a housing enclosing a large number of filter elements of tubular shape, these elements generally being referred to as "filter bags" because the gas to be cleaned is introduced into one end of the tubular element and is discharged through the walls of the tube. These filter bags are made of any one of a wide variety of fabrics as may be required for the particular conditions encountered in any given installation. The pressure of the gas inside the bags keeps them distended during the filtering operation. The bags are cleaned periodically by shutting off the gas supply and allowing the bags to collapse. A partial collapse of the filter bags is obtained by merely shutting off the incoming gas stream; but a complete collapse can be obtained by raising the pressure outside of the bags to a value slightly above the inlet pressure. The movement of the fabric walls of the filter elements caused by the collapsing action is sufficient to dislodge the accumulated deposits of solid particles and cause them to fall down within the bags, normally leaving the bags through the open lower ends.

It is a general object of the present invention to achieve a novel design for the housing and duct work included in gas cleaning equipment of this type, that makes maximum use of the material involved and therefore makes equipment cheaper to manufacture.

It is also an object of the present invention to provide gas cleaning equipment of this type in which the housing and duct work are of simplified construction and eliminates expensive and unsatisfactory elements, such as expansion joints required by high-temperature operations.

These objects of our invention have been achieved by dividing the entire apparatus into a pair of spaced housings, each of which contains a plurality of filter elements. The housings thus provide a pair of spaced walls which are generally parallel and coextensive with each other and which may be utilized to form in part the various gas ducts. A first wall means cooperates with the housings to define an inlet duct in the space between the two housings and which has one wall in common with each of the housings. The inlet duct includes means at one end to connect the duct to a source of gas which is to be cleaned and means to discharge the gas into each housing. A second wall means extends between the housings to define an outlet duct between the two housings and which also has one wall in common with each of the housings. Being immediately adjoining the inlet duct, the outlet duct and inlet duct each have a common wall. The outlet duct receives cleaned gas from each housing and discharges the cleaned gas from the duct at one end thereof. In a preferred embodiment of the invention, the inlet and outlet ducts are horizontally disposed and are substantially co-extensive in length with the two housings. A third wall means cooperates with the housing to define a third duct between the two housings and which likewise has one wall in common with each of the housings. The third duct opens to the atmosphere and is adapted to connect each of the housings with the atmosphere.

For purposes of flow control, valve means are provided to shut off selectively each housing from the third duct and also from the outlet duct in order that the pressure differential on the filter bags may be such as to cause them to collapse. The third duct, which is accordingly sometimes referred to as the collapsing duct, is preferably spaced from the outlet duct at the side thereof remote from the inlet duct, thus defining between the collapsing duct and the outlet duct one or more pairs of passageways which provide communication between the housings and the several ducts through valve controlled openings. While it is possible for the housings to each have one continuous interior space, it is preferred that they be sectionalized by transverse partition walls. In this case the inlet and outlet and third ducts serve all of the sections of the two housings but it is necessary to repeat the passageways and the valve means at each of the sections within the housing.

How the above objects and advantages of our invention, as well as others not specifically referred to herein, are attained, will be more readily understood by reference to the following description and to the annexed drawing, in which:

FIG. 1 is a side elevation of gas cleaning apparatus constructed according to our invention, a portion of one housing being broken away on the line 1—1 of FIG. 3 to show the several ducts between the two housings.

FIG. 2 is an end elevation of the gas cleaning apparatus of FIG. 1 as viewed from the left end thereof.

FIG. 3 is a transverse vertical section on line 3—3 of FIG. 1.

FIG. 4 is a fragmentary horizontal section on line 4—4 of FIG. 1.

FIG. 5 is a fragmentary side elevation of a modified form with a valve controlling the communication of the collapsing duct to atmosphere.

Referring now to the drawing, there is generally indicated at 10, gas cleaning apparatus of the filter type. The apparatus comprises two housings 11 and 12 which are each of generally rectangular configuration and are supported upon the suitable structural framework 14. As shown clearly in FIGS. 2 and 3, the two housings 11 and 12 are spaced apart and the exterior walls 15 and 16 of the housings 11 and 12 respectively, oppose each other. These walls together form a pair of upwardly extending, horizontally spaced opposed walls which are used to form a part of the inlet and outlet ducts and other ducts so that, as will be apparent from the following description, various ducts have one wall in common with each of the two housings.

Each housing has within it a plurality of filter elements 18 which are tubular members of suitable fabric. These tubular elements, commonly referred to as "bags," are closed at their upper ends and are suspended at that end from a supporting grid 20 in each of the housings. The means for supporting the individual filter bags from the grid 20 may be of any suitable type. As shown particularly in connection with the bags in housing 12 in FIG. 3, the bags are fastened at their lower ends, which are open, to collars 23 fastened on a horizontally extending plate 21. An opening 22 in the plate 21 within each collar 23 admits gas into the open lower end of each of the bags 18.

A horizontal plate 21 separates the interior of each housing 11 and 12 from the hopper 24 placed below the housing to receive the dust which is discharged through the open lower ends of the bags. Each hopper 24 is open at the bottom to discharge dust through a valve or the like, not shown in the drawing, which may be of any suitable design and is adapted to regulate the discharge of dust from the hopper and prevent the admission of outside air at this point.

Although it is within the scope of our invention to have the interior space of each housing 11 and 12 one continuous chamber, it is preferred to subdivide the interior space of each housing by means of partitions 26 into a plurality of sections. In the preferred embodiment of the invention illustrated herein, there are five such partitions 26 producing six sections in each of the housings. Each of the sections of the housings contains a plurality of filter bags 18. This arrangement is used in installations handling large volumes of gas to be cleaned since the number of filter bags may amount to several hundred in a large installation; and it is preferred to sectionalize the housings for reasons which are well known in the art as contributing to more favorable operating conditions and easier maintenance.

As may be seen by reference to FIGS. 1 and 3, wall means are provided between the two housings to define inlet duct 30 in cooperation with the opposing walls 15 and 16 of the housings. Such wall means includes wall 31 at the top of the inlet duct and wall 32 which may conveniently be located at the level of the bottom of housings 11 and 12. Top wall 31 is preferably inclined as shown in FIG. 1 in order to reduce the cross section of the inlet duct progressively away from the inlet end. One end, the left hand end in FIG. 1, is provided with flange 33, or other suitable means, whereby the inlet duct may be connected to any source of gas to be cleaned. Inlet duct 30 is disposed generally horizontal and extends for substantially the full length of housings 11 and 12, being closed at the far end by a short section of vertical end wall 34 of the housing.

Bottom wall 32 of the inlet duct is provided at intervals with openings which place the main duct in communication with branch inlet ducts 35. Branch ducts 35 provide communication between the main inlet duct 30 and each of the hoppers 24, thus serving to conduct gas to be cleaned from inlet duct 30 into each of the sections of the housing. Manually operated dampers 36 are preferably provided so that any branch duct 35 can be closed and one of the sections taken out of service while maintenance functions are being performed in the sections concerned.

Above inlet duct 30 and between the opposed walls 15 and 16 is outlet duct 38. Wall 31 is a common wall between the inlet and outlet ducts, forming the bottom wall of the outlet duct. The top wall of the outlet duct is provided by wall 40 extending between opposing walls 15 and 16 and constituting a part of a second wall means which defines the outlet duct.

Wall 40 is preferably parallel to wall 32 so that the outlet duct is of progressively increasing cross section in the direction of glas flow and is of maximum size at the outlet end which is at the right hand end in FIG. 1, or the opposite end of the housings from inlet 33. At the outlet, the outlet duct is provided with a flange 42 to which is connected a transition section 43 leading to the inlet of fan 44. Fan 44 exhausts through outlet 45 to the atmosphere, or to any other suitable equipment if the cleaned gas is to be used in such equipment.

Spaced above wall 40 and generally parallel thereto is wall 48 which extends between the opposed housing walls 15 and 16. The space between walls 40 and 48 is subidivided at intervals by transversely extending walls 49, which are located at the position of each of the partitions 26 and transverse walls 50 which are intermediate the walls 49. These wall members are, in effect, part of the means defining the outlet duct since they provide means for conducting the cleaned gas out of each of the housing sections and into the tapered outlet duct 38. The successive transverse walls 49 and 50 subdivide the space between horizontal walls 40 and 48 into a series of passages. In each of opposed walls 15 and 16, there is an opening 51 for each of the housing sections allowing cleaned gas to leave the housing section and enter one of these passages. Each passage has an opening 52 in bottom wall 40 which allows the cleaned gas to flow through the passage and enter the tapered outlet duct 38. The reason for this construction will become more evident from further description.

Wall 48 together with wall 54, which is above and spaced from wall 48, may be considered as wall means cooperating with the housings to define a third duct 55 between the two housings. This duct is located beyond outlet duct 38 at the side remote from inlet duct 30 in order to accommodate the passages for admitting gas to the outlet duct at the side away from the inlet duct.

This third duct 55 is closed at one end by wall 49a and at the other end 56 is open to the atmosphere. In an alternative form of the invention disclosed in FIG. 5, air flow through said open end is controlled by valve 57 operated by air cylinder 58.

Wall 48 which constitutes the bottom wall of this third duct 55 has in it a plurality of openings 60 which are vertically aligned with openings 52 in wall 40. At each of these vertically arranged pairs of openings is a valve member 61 which is raised and lowered by air cylinder 62 between an upper position in which valve 61 closes the opening 60 and a lower position in which the valve closes opening 52.

Near the top of the space between the two housings 11 and 12 is a walkway 65, which may also serve as a support for air cylinders 62. Walkway 65 runs for the full length of the housings so that the single walkway passes all of doors 66 which open off the walkway into the individual sections of the two housings. While it is entirely optional to do so, it is preferred to have transverse walkways 68 extend across each of the housing sections from doorway 66 to the opposite wall where there is located a ladder 69 by means of which a workman may climb down from the upper walkway to sheet 21 to reach the bottom fastenings of the filter bags 18.

Having described the construction of a preferred embodiment of our invention, we shall now describe briefly its operation. Gas to be cleaned enters inlet duct 30 from any source through the opening at flange 33 and flows in a generally horizontal direction through the inlet duct. It leaves the inlet duct through the plurality of branch ducts 35 each of which leads into a hopper 24 beneath one of the sections into which the interior of each housing is divided by means of the partitions 26. The gas stream entering housing 24 spreads out within the hopper and is distributed to the lower open ends of all of the filter bags 18. The gas rises through openings 22 into the filter bags and flows outwardly through the fabric walls of the bags into the interior space in the housing above collar plate 21.

The gas is cleaned by passing through the fabric walls of the filter elements and leaves each housing section through opening 51 entering one of the passages between the two vertically spaced walls 40 and 48. In normal operation, all of valves 61 are raised by air cylinder 62 so that the openings 52 are open and the cleaned gas can flow from the passage through an opening 52 into the tapered outlet duct 38. From the outlet duct, the cleaned gas passes through transition section 43 to fan 44 and is then exhausted from the fan either to the atmosphere or to other equipment.

It is obvious, fan 44 being downstream from the gas cleaning apparatus, that sub-atmospheric pressures are maintained within housings 11 and 12. Advantage may be taken of this fact to clean the filter elements by collapsing them. A cleaning cycle is carried out in any given housing section by lowering the valve 61, controlling air flow at that section, to close the opening 52, thus preventing gas from leaving the housing section. Movement of valve 61 to close opening 52 causes the port 60 above to be opened (FIG. 1), placing the housing section in communication through the associated passage with the collapsing duct 55. Since the collapsing duct is in communication with the atmosphere through port 56, opening port 60 has the effect of raising the air pressure in the housing section externally of filter elements 18 to substantially atmospheric pressure which is greater than the pressure inside the filter elements, thus causing the filter element elements to collapse. The movement of the filter element causes dust particles lodged on the inside surface of the tubular elements to become dislodged and the dust falls downwardly within the elements, leaving the bags through the open lower ends to enter hopper 24. As a result of this reversal of the differential pressure, the bags not only move from a distended to collapsed position, but there may be some reverse flow of air through the filter elements which aids in removing accumulated dust particles. After a sufficient interval of time for the dislodged dust to fall out of the filter bags, the cleaning cycle is terminated and the section restored to filtering action by raising the valve 61 to open port 52 and close port 60. This is the normal operating position of the valve and is the one shown at the extreme left of the filter in FIG. 1. The cleaning cycle is repeated at each section of the housing as often as required.

It may be desired to change the cleaning cycle somewhat by adding valve 57 which is operated in synchronism with the valve 61. Valve 57 is in the open position as shown in dotted lines in FIG. 5 at the time that valve 61 is lowered from the normal operating position to the collapsing position closing port 52. By opening and closing valve 57 the cleaning cycle is divided into two distinct phases. In the first phase valve 57 is open and the pressure differential across the bags is reversed and the sudden collapsing action taking place jars the accumulated dust loose. The second phase begins when valve 57 is lowered to close duct 55 to communication with the atmosphere. This decreases the pressure in the housing externally of filter elements 18 and makes the pressure differential across the bags become substantially zero. The bags now hang limp, but are sufficiently open to allow dust to fall down and out of the bags. After several seconds to allow the dust to settle, the cleaning cycle is terminated by opening port 52 and closing port 60. After valve 61 is changed, valve 57 is opened. When this type of cleaning cycle is used, the valve 57 is operated in timed relation to each one of the valves 61 as the latter are operated.

From the foregoing description it will be seen that the extensive use of wall members to provide common walls for the housings and the several gas conveying dusts results in the most efficient use of this material. Hence the present design requires less material for these elements of the filter than in previously known designs. Since the inlet and outlet ducts are integral with the housing, expansion joints may be eliminated in installations handling high temperature gases. Expansion joints are an item of substantial cost both in construction and in maintenance, and their elimination is a considerable advantage from a practical standpoint. A single walkway between the two housings serves both housings, again economizing on the use of steel and reducing the overall dimensions of the installations compared with previously known designs.

Since various changes in the specific design and arrangement of various parts of the filter may be made without departing from the spirit and scope of our invention, it is to be understood that the above description is considered to be illustrative of, rather than limitative upon, the invention as defined by the appended claims.

We claim:

1. Gas cleaning apparatus comprising, a pair of spaced elongated sectioned housings, filter elements in each section of said housings, an elongated inlet duct means located intermediate of and coextensive with said housings, said inlet duct means having an opening at one end thereof connectible to a source of gas to be cleaned and having a first plurality of lateral openings longitudinally spaced, said first plurality of openings communicating with said filter elements in said sectioned housings respectively, said inlet duct being progressively reduced in cross sectional area from said opening connectible to a source of gas to be cleaned to the other end thereof, elongated outlet duct means located intermediate of and coextensive with said housings, said outlet duct having an opening at one end thereof connectible to a suction means and a second plurality of lateral openings spaced longitudinally, said second plurality of openings in said outlet duct communicating with a third plurality of longitudinally spaced openings in said housings respectively, and said outlet duct being progressively reduced in cross sectional area from said opening connectible to said suction means to the other end thereof.

2. Gas cleaning apparatus as claimed in claim 1 wherein the longitudinal configuration of said inlet and said outlet ducts are defined by a pair of longitudinally extending spaced parallel members extending laterally between said pair of section housings and having a longitudinally extending diagonal member extending laterally between said sectioned housings in spaced relationship to said parallel members.

3. Gas cleaning apparatus as claimed in claim 2 further including valve means located between each of said first plurality of openings in said inlet duct and said filter elements in each spaced pair of sections of said spaced housings.

4. Gas apparatus as claimed in claim 3 further including collapsing duct means longitudinally defined by a pair of longitudinally extending spaced members extending laterally between said pair of sectioned housings and having a fourth plurality of openings communicating with said third plurality of openings in said sectioned housings, respectively, said collapsing duct means being located on the side of the outlet duct remote from said inlet duct and open to the atmosphere, and valve means to selectively connect said sections of said housing to said outlet duct or to said collapsing duct, respectively.

5. Gas cleaning apparatus as claimed in claim 4 further including valve means for shutting off the collapsing duct from the atmosphere.

References Cited in the file of this patent

UNITED STATES PATENTS 2,836,256    Caskey ------------------ May 27, 1958

FOREIGN PATENTS 332,601     Great Britain ------------ July 23, 1930
519,180     Great Britain ------------ Mar. 19, 1940